United States Patent [19]

D'Alelio

[11] 4,168,360
[45] Sep. 18, 1979

[54] POLYMERIZATION PRODUCTS OF VINYL-TERMINATED POLYIMIDE DERIVATIVES

[75] Inventor: Gaetano F. D'Alelio, South Bend, Ind.

[73] Assignee: Plastics Engineering Company, Sheboygan, Wis.

[21] Appl. No.: 927,813

[22] Filed: Jul. 25, 1978

[51] Int. Cl.$^2$ .................... C08G 73/12; C08G 73/16
[52] U.S. Cl. .................................. 525/426; 526/259; 204/159.11; 204/159.15; 260/326.26; 428/435; 428/443; 428/474; 528/26; 528/125; 528/170; 528/185; 528/188; 528/229; 528/321; 528/322; 528/352; 528/353
[58] Field of Search ............... 528/177, 125, 170, 221, 528/229, 353, 26, 185, 188, 321, 322, 352; 526/260, 263, 259; 204/159.11, 159.15; 260/326.26

[56] References Cited

U.S. PATENT DOCUMENTS

| | | | |
|---|---|---|---|
| 3,879,349 | 4/1975 | Bilow et al. | 528/170 |
| 3,897,395 | 7/1975 | D'Alelio | 528/170 |
| 3,998,786 | 12/1976 | D'Alelio | 528/170 |
| 4,060,515 | 11/1977 | D'Alelio | 528/170 |

*Primary Examiner*—Lester L. Lee
*Attorney, Agent, or Firm*—Walter J. Monacelli

[57] ABSTRACT

Novel, unsaturated polyimide-polyester polymerization products and processes for their preparation are disclosed herein. The polyimide-esters from which the polymerization products are derived are derivatives of anhydride-terminated aromatic polyimides, from which they are prepared by esterification to provide unsaturated ester groups having a terminal —CH=CH$_2$ group. These new compositions are crosslinked, insoluble, infusible polymers produced without by-product formation.

19 Claims, No Drawings

POLYMERIZATION PRODUCTS OF VINYL-TERMINATED POLYIMIDE DERIVATIVES

BACKGROUND OF THE INVENTION

1. Field of the Invention

The invention relates to new polymeric compositions derived from aromatic polyimides containing terminally unsaturated ester groups. More specifically, it relates to such polymers derived from polyimide-ester compositions in which the terminal ester groups are moieties that contain terminal $CH_2=CH-$ functions capable of polymerizing and forming crosslinked polymers. Still more specifically, it relates to such crosslinked polymers obtained therefrom without the formation of by-products.

2. State of the Prior Art

Polyimides, as prepared from aromatic dianhydrides and aromatic diamines, are known to have the desired property of high heat resistance and high solvent resistance. Such polyimides, upon consideration to an infusible condition, generate by-products such as water and other vapors or gases, which introduce voids into the fabricated products that detract from the expected good physical properties. In addition, because of these same desirable properties, they are untractable and therefore very difficult and expensive to work into desired shapes and forms.

Recent patents, such as U.S. Pat. No. 3,879,395 and 3,998,786, are directed to improving the tractability of the aromatic polyimides by attaching various terminal groups to polyimide oligomers whereby the chains are extended by coupling of the terminal groups. In both of these patents the coupling groups are attached as terminal imide moieties containing vinyl, propargyl, nitrile, etc. groups. Thus the terminal anhydride group is converted to an imide group containing a vinyl, nitrile, propargyl, etc. group. However, in neither of these patents nor in any other related prior art references, has there been found any reference or disclosure that the terminal anhydride group on each end could be converted to two ester groups of which at least one or both could contain polymerizable groups. Such ester groups would contribute higher tractability to the composition, and the crosslinking groups could be controlled to two, three or four such groups.

SUMMARY OF THE INVENTION

In accordance with the present invention, it has been found that infusible and insoluble polymerization products are derived from polyimide derivatives prepared by converting the terminal anhydride groups in an anhydride-terminated aromatic polyimide to ester groups containing at least one terminal $CH_2=CH-$ group at each terminal of the polyimide. Moreover, it has also been found that such monomeric compositions have greater tractability than the corresponding anhydride-terminated and the corresponding amine-terminated polyimides. Furthermore, they can be fabricated and cured to the polymerization products of this invention at practical temperatures and pressures to give insoluble, infusible products having improved heat and solvent resistance without by-product formation. The monomeric compositions are described and claimed in patent application Ser. No. 927,812, filed the same date herewith.

The polymerization products of this invention have a plurality of repeating units of the formula (I):

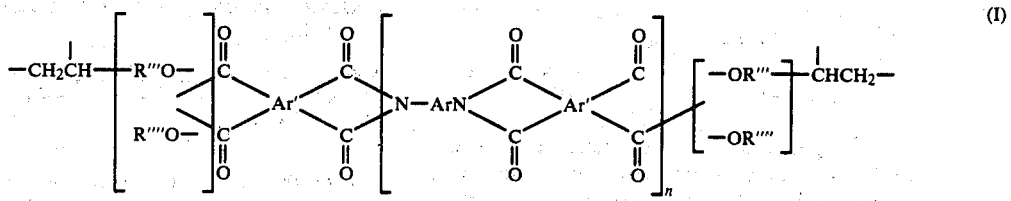

wherein:

Ar' is a tetravalent aromatic organic radical, the four carbonyl groups being attached directly to separate carbon atoms and each pair of carbonyl groups being attached to adjacent carbon atoms in the Ar' radical except that in the case of the Ar' being a naphthalene radical, one or both pairs of the carbonyl groups may be attached to peri carbon atoms;

Ar is a divalent aromatic organic radical;

n is an integer of at least one, preferably 1–20;

R''' is a divalent organic moiety containing 1 to 12 carbon atoms or merely a valence bond connecting the O directly $$-CH_2\overset{|}{CH}-\text{ group};$$

R'''' is H, R' or the residue of an alcohol other than R'OH containing 1 to 18 carbon atoms, or $$-CH_2\overset{|}{CH}-R'''-;$$

and

R' is an organic moiety containing 2 to 14 carbon atoms and having a terminal $CH_2=CH-$ structure.

The monomeric polyimide esters are conveniently prepared by esterification of the anhydride-terminated polyimide of the formula:

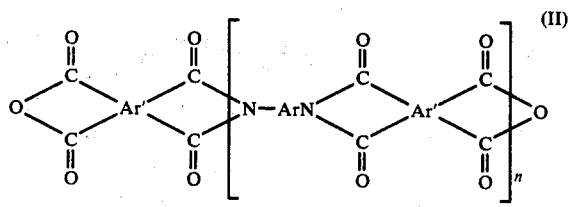

wherein Ar', Ar and n are as defined above.

Esterification of (II) occurs in the terminal anhydride function first with the formation:

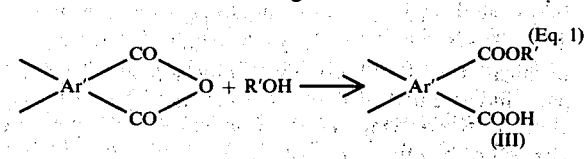

of a hemi-ester (III), which, by continued esterification with an alcohol of the formula ROH wherein R is R' or the residue of an alcohol other than R'OH containing 1–18 carbon atoms, to yield the diester (IV):

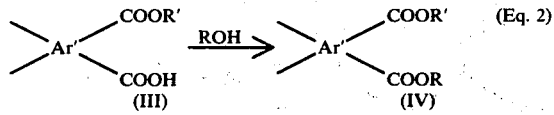

In some cases, such as when vinyl esters are desired, transesterification, for example, with vinyl esters such as vinyl acetate or vinyl benzoate, may be used to introduce the terminal vinyl structure, eg:

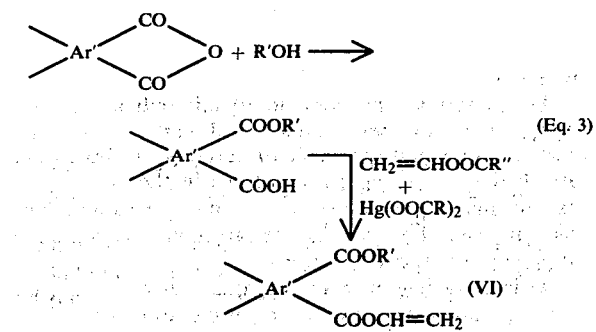

With regard to esterifications with alcohols that polymerize actively, particularly if heated, such as the vinyl benzyl alcohols, it is desirable to conduct all or part of the esterification by converting the anhydride or hemi-ester to the corresponding acid halide and performing the esterification at lower temperatures, e.g., at or below room temperature, thus:

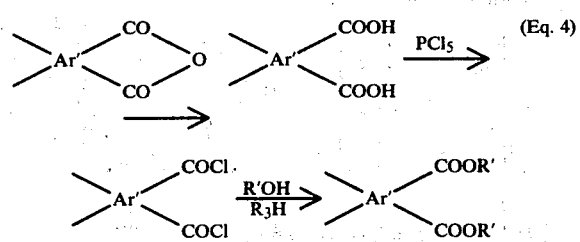

and

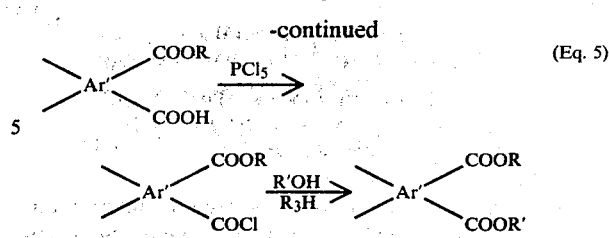

Alternatively, esterification can also be achieved by reacting a metal salt derivative of the terminal anhydride or hemi-ester group with an alkyl sulfate, e.g.:

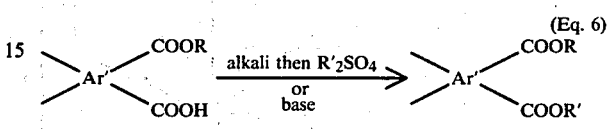

Also, the esters suitable for use in this invention may be prepared by amidating the amine-terminated polyimide oligomers of the formula VII:

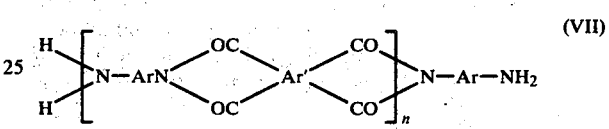

wherein Ar, Ar' and n have the same meaning as in formula (I), or aromatic diamines of the formula $H_2NArNH_2$ such as when n in formula VII above equals zero, with an unsymmetrical aromatic dianhydride diester of the formula:

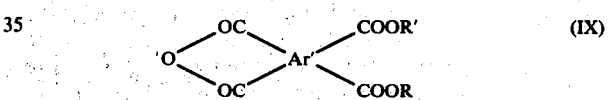

wherein R' has the same meaning as in Formula I and R represents R' and hydrocarbon radicals of one to twenty carbon atoms, thus:

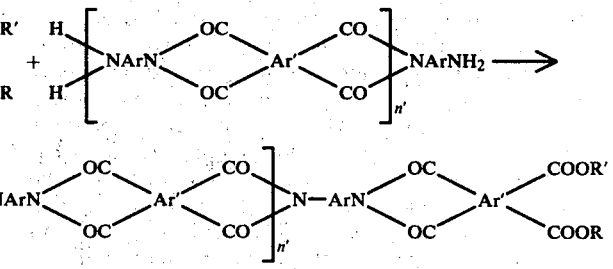

The amine-terminated oligomers (VII) used hereinabove as intermediates in the preparation of the polyimide esters (I) of this invention as illustrated by equation 7 are prepared by reacting a molar excess, i.e., n+1 moles of an aromatic diamine, $H_2NArNH_2$, with n moles of an aromatic dianhydride wherein Ar and Ar' have the same meaning as defined heretofore, and the aromatic diamines and the aromatic dianhydrides are the same pair of co-reactants used to prepare the anhydride-terminated oligomers represented by Formula II. The polyimide amine-terminated oligomers (VII) used as intermediates may be conveniently prepared by the same process used to synthesize the anhydride-terminated polyimides (II) used as intermediates for esterification except for the molar ratio of amine and anhydride used. These syntheses are exemplified in U.S. Pat. Nos. 3,897,395 and 1,058,505 and hereinafter with specific reference for example to the synthesis of the anhydride terminated polyimides.

The polyimide anhydrides (II) used in the above reactions in the synthesis of esters used to prepare the polymerization products of this invention are prepared by reacting a molar excess, i.e., n+1 moles of an aromatic dianhydride with n moles of an aromatic diamine. The aromatic dianhydride has the formula:

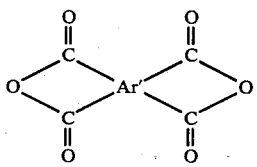

wherein Ar' is a tetravalent aromatic organic radical, preferably containing at least one ring of six carbon atoms, said ring characterized by benzenoid unsaturation, the four carbonyl groups being attached directly to separate carbon atoms and each pair of carbonyl groups being attached to adjacent carbon atoms in the Ar' radical except that when Ar' represents the naphthalene radical, one or both pairs of carbonyl groups may be attached to the peri carbon atoms.

The aromatic diamines useful in this preparation are represented by the formula $H_2N-Ar-NH_2$ wherein Ar is a divalent aromatic organic radical.

In preparing the anhydride-terminated polyimides, any of the aromatic tetracarboxylic acid dianhydrides known in the prior art can be used. Among the useful dianhydrides are 3,3',4,4'-benzophenonetetracarboxylic acid dianhydride, pyromellitic dianhydride, 2,3,6,7-napthalene tetracarboxylic acid dianhydride, 1,4,5,6-tetracarboxylic dianhydride, 3,3',4,4'-diphenyl tetracarboxylic acid dianhydride, 1,2,5,6,-napthalene tetracarboxylic acid dianhydride, 2,2',3,3' diphenyl tetracarboxylic acid dianhydride, 2,2-bis(3,4-dicarboxyphenyl) propane dianhydride, 3,4,9,10-perylene tetracarboxylic acid dianhydride, bis(3,4-dicarboxyphenyl) ether dianhydride, naphthalene-1,2,4,5-tetracarboxylic acid dianhydride, naphthalene-1,4,5,8-tetracarboxylic acid dianhydride, decahydronaphthalene-1,4,5,8-tetracarboxylic acid dianhydride, 4,8-dimethyl-1,2,3,5,6,7-hexahydronaphthalene-1,2,5,6-tetracarboxylic acid dianhydride, 2,6-dichloronaphthalene-1,4,5,8-tetracarboxylic acid dianhydride, 2,7-dichloronaphthalene-1,4,5,8-tetracarboxylic acid dianhydride, 2,3,6,7-tetrachloronaphthalene-1,4,5,8-tetracarboxylic acid dianhydride, phenanthrene-1,8,9,10-tetracarboxylic acid dianhydride, cyclopentane-1,2,3,4-tetracarboxylic acid dianhydride, pyrrolidine-2,3,4,5-tetracarboxylic acid dianhydride, pyrazine-2,3,5,6-tetracarboxylic acid dianhydride, 2,2-bis)2,3-dicarboxyphenyl) propane dianhydride, 1,1-bis (2,3-dicarboxyphenyl) ethane dianhydride, 1,1-bis(3,4-dicarboxyphenyl) ethane dianhydride, bis(2,3-dicarboxyphenyl) methane dianhydride, bis(3,4-dicarboxyphenyl) methane dianhydride, bis(3,4-dicarboxyphenyl) sulfone dianhydride, and benzene-1,2,3,4,-tetracarboxylic acid dianhydride. The first three mentioned dianhydrides are preferred.

Aromatic diamines useful in preparing the starting polyimides have the formula:

$$NH_2-Ar-NH_2$$

wherein Ar is a divalent aromatic organic radical. Preferred aromatic diamines are those wherein Ar is a divalent benzenoid radical selected from the group consisting of:

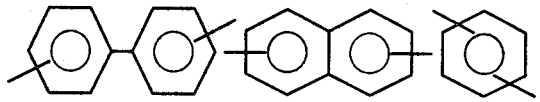

and multiples thereof connected to each other by $R^{III}$, e.g.,

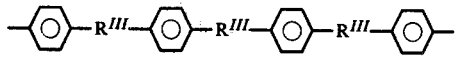

wherein $R^{III}$ is $-CH=CH-$,

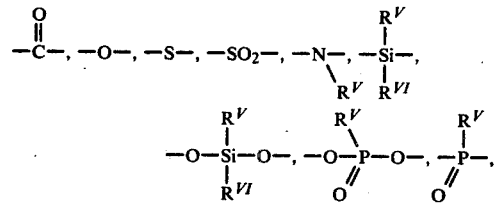

or an alkylene chain of 1-3 carbon atoms, wherein $R^V$ and $R^{VI}$ are each selected from the group consisting of alkyl and aryl containing one to six carbon atoms, e.g., methyl, ethyl, hexyl, n-butyl, i-butyl and phenyl. Preferred Ar' groups are:

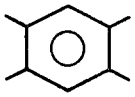

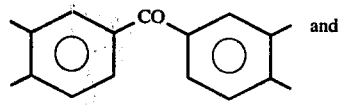 and

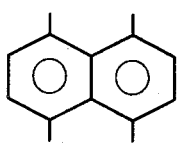

Examples of the aromatic diamines which are suitable for use in the present invention are 4,4'-diaminodiphenyl propane, 4,4'-diamino-diphenyl methane, benzidine, 3,3'-dichlorobenzidine, 4,4'-diamino-diphenyl sulfide, 3,3'-diamino-diphenyl sulfone, 4,4'-diamino-diphenyl sulfone, 4,4'-diamino-diphenyl diphenylsilane, 4,4'-diamino-diphenyl ethyl phosphine oxide, 4,4'-diaminodiphenyl phenyl phosphine oxide, 4,4'-diamino-diphenyl N-methyl amine, 4,4'-diamino-diphenyl N-phenyl amine and mixtures thereof, 3,3'-dimethyl-4,4'-diaminodiphenylmethane, 3,3'-diethyl-4,4'-diaminodiphenyl-methane, 3,3'-dimethoxy-4,4'- diaminodiphenylmethane, 3,3'-diethoxy-4,4'-diaminodiphenylmethane, 3,3'-dichloro-4,4',4,4'-diaminodiphenylmethane, 3,3'-dibromo-4,4'-diaminodiphenylmethane, 3,3'-dicarboxy-4,4'-diaminophenylmethane, 3,3'-dihydroxy-4,4'-diaminophenylmethane, 3,3'-disulpho-4,4'-diaminodiphenylmethane, 3,3'-dimethyl-4,4'-diaminodiphenylether, 3,3'-diethyl-4,4'-diaminodiphenylether,, 3,3'-dimethoxy-4,4'-diaminodiphenylether, 3,3'-diethoxy-4,4'-diaminodiphenylether, 3,3'-dichloro-4,4'-diaminodiphenylether, 3,3'-dibromo-4,4'-diamino diaminodiphenylether, 3,3'-dicarboxy-4,4'-diaminodiphenylether, 3,3'-dihydroxy-4,4'-diaminodiphenylether, 3,3'-disulfo-4,4'-diaminodiphenylether, 3,3'dimethyl-4,4'-diaminodiphenylsulfide, 3,3'-diethyl-4,4'-diaminodiphenylsulfide, 3,3'-dimethoxy-4,4'-diaminodiphenylsulfide, 3,3'-diethoxy-4,4'-diaminodiphenylsulfide, 3,3'-dichloro-4,4'-diaminodiphenylsulfide, 3,3'-dibromo-4,4'-diaminodiphenylsulfide, 3,3'-dicarboxyl-4,4'-diaminodiphenylsulfide, 3,3'-dihydroxy-4,4'-diaminodiphenylsulfide, 3,3'-disulfo-4,4'-diaminodiphenylsulfide, 3,3'-dimethyl-4,4'-diaminodiphenylsulfone, 3,3'-diethoxy-4,4'-diaminodiphenylsulfone,3,3'-dichloro-4,4'-diaminodiphenylsulfone, 3,3'-dicarboxy-4,4'-diaminodiphenylsulfone, 3,3'-dihydroxy-4,4'-diaminodiphenylsulfone, 3,3'-disulfo-4,4'-diaminodiphenylsulfone, 3,3'-diethyl-4,4'-diaminodiphenylpropane, 3,3'-dimethoxy-4,4'-diaminodiphenylpropane, 3,3'-dibromo-4,4'-diaminodiphenylpropane, 3,3'-dichloro-4,4'-diaminodiphenylpropane, 3,3'-dicarboxy-4,4'-diaminodiphenylpropane, 3,3'-dihydroxy-4,4'-diaminodiphenylpropane, 3,3'-disulfo-4,4'-diaminodiphenylpropane, 3,3'-dimethyl-4,4'-diaminobenzophenone, 3,3'-dimethoxy-4,4'-diaminobenzophenone, 3,3'-dichloro-4,4'-diaminobenzophenone, 3,3'-dibromo-4,4'-diaminobenzophenone, 3,3'-dicarboxy-4,4'-diaminobenzophenone, 3,3'-dihydroxy-4,4'-diaminobenzophenone, 3,3'-disulphodiaminobenzophenone, 3,3'-diaminodiphenylmethane, 3,3'-diaminodiphenylether, 3,3'-diaminodiphenylsulfide, 3,3'-diaminodiphenylsulfone, 3,3'-diaminodiphenylpropane, 3,3'-diaminobenzophenone, 2,4-diaminotoluene, 2,6-diaminotoluene, 1-isopropyl-2,4-phenylenediamine, 2,4-diaminoanisole, 2,4-diaminomonochlorobenzene, 2,4-diaminofluorobenzene, 2,4-diaminobenzoic acid, 2,4-diaminophenol and 2,4-diaminobenzenesulfonic acid and phenylene diamines. Preferred diamines are 4,4'-oxydianiline, 4,4'-sulfonyldianiline, 4,4'-methylene dianiline, 4,4'-diaminobenzophenone, 4,4'-diaminostilbene and the phenylene diamines, 2,4 diaminotoluene and all the meta and para isomers of $H_2NC_6H_4OC_6H_4OC_6H_4NH_2$.

The polyimide starting materials used in the process of this invention may be prepared conveniently as shown in U.S. Pat. Nos. 3,897,395 and 4,058,505, by reacting the dianhydride with the diamine in a phenol solvent of the formula:

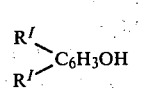

wherein each $R^I$ is hydrogen or a methyl radical in the presence of certain organic azeotroping agents, particularly cyclic hydrocarbons of 6 to 8 carbon atoms and most preferably benzene or toluene until most of the water of reaction is eliminated. The reaction temperature is less than 140° C. and also should be below the boiling point of the phenol used but higher than the boiling point of the azeotroping agent. The vapor phase temperature lies between that of the water azeotrope and no higher than 95° C. As the water of reaction and azeotroping agent are removed from the reaction mixture, quantities of the azeotroping agent are returned to the reaction mixture so as to maintain the temperature and reaction mixture volume substantially constant. It is preferred that the process be continuous with continuous removal of water and continuous return of azeotroping agent. This is conveniently done by the use of a conventional Dean-Stark trap and condenser wherein after the azeotrope condenses, the water preferably sinks to the bottom of the trap for subsequent removal and the azeotroping agent overflows the trap and returns to the reaction mixture. Initially, the trap is filled with azeotroping agent. For brevity, this apparatus will be referred to herein as cresol-benzene azeotropic apparatus.

By using an excess of the anhydride, the terminal groups of the polyimide will be anhydride groups. The more excess there is of the anhydride, the shorter will be the molecular length. Advantageously the amount of excess anhydride is calculated in accordance with the desired length or molecular weight of the desired starting polyimide.

A few illustrative examples of R', that is, an organic moiety containing 2 to 14 carbon atoms and a terminal —CH=CH$_2$ group are:

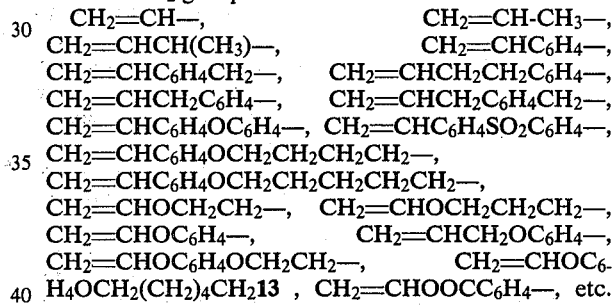

For reasons of economy and commercial availability of intermediates for synthesis, the preferred R' groups are $CH_2=CH-$, $CH_2=CHC_6H_4-$, $CH_2=CHC_6H_6-$ and $CH_2=CHC_6H_4CH_2-$. The corresponding hydroxy compounds have the formulas R'OH, and are classified as alcohols or phenols. In the case of the vinyl groups, the $CH_2=CH-$ group is introduced as indicated above by means of the esters of vinyl alcohol, namely the vinyl esters $CH_2=CHOCOR''$ wherein R'' is any hydrocarbon moiety containing one to twenty carbon atoms, preferably 2 to 6 carbon atoms as represented by vinyl acetate, vinyl benzoate, vinyl butyrate, etc.

Illustrative examples of R are, in addition to H and R', the organic moieties containing 1 to 20 carbon atoms, e.g., —CH$_3$, —CH$_2$CH$_3$, —CH$_2$CH$_2$CH$_3$, HC(CH$_3$)$_2$, —CH$_2$CH$_2$CH$_2$CH$_3$,

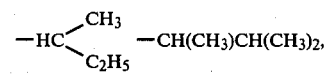

—(CH$_2$)$_4$CH$_3$, —CH$_2$—CH(C$_2$H$_5$)$_2$, —CH$_2$CH=CHCH$_3$, —(CH$_2$)$_{11}$CH$_3$, —(CH$_2$)$_{19}$—CH$_3$, —C$_6$H$_5$, —C$_6$H$_{11}$, —C$_6$H$_4$CH$_3$, —C$_6$H$_4$C$_6$H$_5$, —C$_{10}$H$_7$, —CH$_2$CH$_2$OC$_6$H$_5$, —CH$_2$C$_6$H$_4$SO$_2$C$_6$H$_5$, —CH$_2$C-H$_2$OOCC$_6$H$_5$, —CH$_2$C$_6$H$_5$, —CH$_2$C$_6$H$_{11}$, —CH$_2$C$_{10}$H$_7$, etc. The corresponding hydroxy compounds have the formula ROH.

The above monomeric materials can be converted to the insoluble, infusible polymerization products of this invention by heat alone, such as by heating at temperatures in the range of 200° C. to 350° C., or even at lower temperatures, such as 100° C. to 200° C. or, if desired, by the addition of catalysts that generate free radicals such as benzoyl, peroxide, the perbenzoates, cumyl mono and diperoxides, and a host of others that are well known in the vinyl monomer art, which include redox systems which promote polymerization of $CH_2=CH-$ containing monomers at or even below room temperature, or by ionizing radiation or ultraviolet radiation, etc.

These polymerization products can be compounded with fillers of all sorts in the preparation of molding compounds, such as with graphite and quartz fibers or fillers to maintain high temperature resistance, etc.

The hemi-esters prior to conversion to the polymerization product of this invention may be applied as coatings and bonding agents for metals such as iron, copper, aluminum, steel, etc. either alone or as mixtures with the tetraesters containing two to four terminal $CH_2=CH-$ structures, and then converted to the polymerization products in situ. Also important is the fact that these hemi-esters may be copolymerized with polyimides not containing terminal ester groups but imide structures which have terminal $CH_2=CH-$, $CH\equiv C-$ or

a number of which are disclosed in U.S. Pat. No. 3,998,786.

The monomeric esters can be used as varnishes and coatings in appropriate solvents which depend on the nature of the constituent diamine and dianhydrides used in the synthesis of the polyimide esters, and after application are converted to the polymerization products of this invention by drying, heating, etc.

In most cases the solvent is an aprotic organic compound having a dielectric constant between 35 and 45, preferably one which is water soluble. Representative aprotic compounds are N,N-dimethylformamide, N,N-diethylformamide, N,N-dimethylmethoxyacetamide, N-methyl caprolactam, caprolactam, N,N-dimethylacetamide, N,N-diethylacetamide, dimethyl sulfoxide, N-methyl-α-pyrrolidone, tetramethylurea, hexamethylphosphonamide, tetramethylene sulfone, N,N,N',N'-tetramethyl-ethylmalonamiden, N,N,N',N'-tetramethyl glutaramide, N,N,N', N'-tetramethylsuccinamide, thiobis(N,N-dimethylacetamide), bis(N,N-dimethylcarbamylmethyl) ether, N,N,N'N'-tetramethylfuraramide, methylsuccinonitrile, N,N-dimethylcyanocetamide, N,N-dimethyl-β-cyano-propionamide, N-formyl-piperdine and butyrolactone, etc.

Of the solvents, dimethylacetamide is most preferred. Other preferred solvents are dimethylformamide, N-methyl pyrrolidinone, dimethyl sufoxide, butyrolactone and caprolactate.

In many cases, non-aprotic solvents can be used. For example, xylene, phenol, anisole, benzonitrile, acetophenone, methylphenylether, methylene chloride, chloroform, carbon tetrachloride or mixtures of these with each other, the aprotic solvents or with relatively poor solvents such as benzene, toluene, cyclohexane, cyclohexene, dioxane, butyl cellosolve and the like.

SPECIFIC EMBODIMENTS OF THE INVENTION

The invention is illustrated by the following examples which are intended merely for purpose of illustration and are not to be regarded as limiting the scope of the invention or the manner in which it may be practiced. Unless specifically indicated otherwise, parts and percentages are given by weight.

EXAMPLE I

Preparation of Anhydride-terminated Oligomeric Polyimide #1

Into a 100 ml. three-neck, round bottom flask equipped with a magnetic stirrer, thermometer, condenser, gas inlet tube, dropping funnel, etc. there is placed, under nitrogen atmosphere, a solution of benzophenone-tetracarboxylic acid anhydride (BTCA) (6.444 g., 0.02 mole) in 25 ml. of dimethylacetamide (DMAC). Then a solution of 4,4'-oxydianiline (ODA) (2.00 g., 0.01 mole) in 15 ml. of DMAC is added over a period of 15 minutes. The reaction, which is exothermic, is maintained at 40° C. during the addition, following which it is heated at 85° C–90° C. for 15 minutes. To this clear amber-colored solution, acetic anhydride (3.06 g., 0.03 mole) is added and the mixture is heated to 125° C. Within 15 minutes a yellow precipitate is formed. After heating the reaction mixture for 1 hour, the solvents are removed in a rotary flash evaporator. The residual light-yellow solid is washed with anhydrous ether and dried in a vacuum oven at 140° C. to afford a quantitative yield. It softens slightly on a Fisher-Johns melting point apparatus at 120° C. and does not melt when heated to 300° C. The product is soluble in m-cresol and N-methyl-2-pyrrolidone and only slightly soluble in boiling benzonitrile, acetophenone or DMAC. The elemental analysis is found to be for C: 68.3% and for H: 2.4%, which are in good agreement with the calculated values for $C_{46}H_{20}N_2O_{13}$ having the formula:

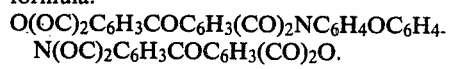

EXAMPLE II

Hemi-ester of Polyimide of Example I

Into the reaction equipment used in Example I there is placed 50 ml. of m-cresol, 4.04 gm. of polyimide #1, 0.1 g. toluene sulfonic acid, 4.8 gm. of allyl alcohol and the mixture is heated at reflux for 1 hour. Water:methanol (50:50) is added to the precipitate and washes the polymer product which is isolated by filtration and dried in a vacuum oven at 130°–140° C. to give an almost quantitative yield of 4.5 g. The elemental analysis of 67.5% carbon and 3.45% hydrogen are in good agreement with the calculated values for $C_{52}N_{32}N_2O_{15}$ having the formula:

(Ester #1)

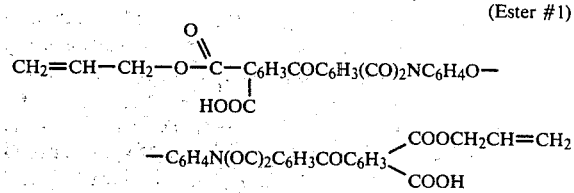

EXAMPLE III

Preparation of Anhydride-terminated Polyimide #2

Using the m-cresol-benzene azeotropic procedure, there is allowed to react benzophenone-tetracarboxylic acid anhydride (BTCA) (4.0279 g., 0.125 mole) and 1,3-di(3-aminophenoxy)benzene (DAPB-3,3) (2.9223 g., 0.01 mole) in 40 ml. of m-cresol and 10 ml. of benzene. There is obtained 5.76768 g. of polyimide #2 which is a light yellow powder which is soluble in m-cresol, DMAC, sulfolane and dioxane. In a Fisher-Johns melting point apparatus, this melts at 200° C. The TGA in air shows losses at 200° C. of 1%, 3% at 300° C., 4% at 400° C., 5% at 500° C. and 17% at 600° C. The elemental analysis is: C: 71.4% and H: 3.2%, which are in excellent agreement with the calculated values for the formula:

O(OC)$_2$C$_6$H$_3$COC$_6$H$_3$(CO)$_2$[NC$_6$H$_4$OC$_6$H$_4$OC$_6$H$_4$-N(OC)$_2$C$_6$H$_3$COC$_6$H$_3$(CO)$_2$]$_4$O.

EXAMPLE IV

Preparation of Esters of Anhydride-Terminated Polymer #2

Part A

In the same equipment used in Example I, there is added 5.2 g. of polyimide #2, 40 ml. of m-cresol, 0.1 gm. of toluene sulfonic acid and 4.8 gm. of allyl alcohol and the mixture heated to 100° C. for one hour. A liquid sample is then withdrawn and analyzed. The elemental analysis is found to show C: 71.13% and H: 3.27%, which values are in good agreement with the calculated values for C$_{63}$H$_{90}$N$_8$O$_{37}$ having the hemi-ester formula:

(Ester #2)

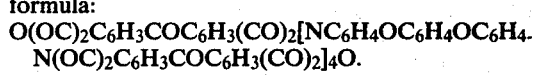

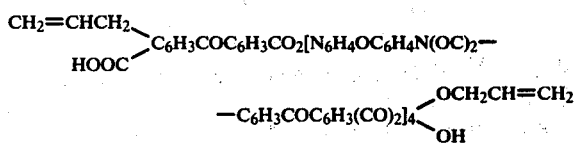

Part B

The apparatus is converted by the addition of a Dean-Stark trap, to a continuous azeotroping apparatus. The trap is filled with toluene, 10 ml. of benzene is added to the reaction mixture together with 5 ml. of additional allyl alcohol and the reaction mixture is heated at reflux for 5 hours or until no more water of reaction is formed. Two grams of sodium bicarbonate is added to the mixture to neutralize the toluene sulfonic acid. The solution is then filtered and concentrated on a rotary evaporator and vacuum dried to constant weight at 130°-135° C. The isolated product is washed with ether and redried in a vacuum oven. The elemental analysis is found to give C: 71.64% and H: 3.45%, which values are in good agreement with the calculated values for the tetra-ester C$_{69}$H$_{98}$N$_8$O$_{37}$ having the formula:

(CH$_2$=CHCH$_2$OOC)$_2$C$_6$H$_3$COC$_6$H$_3$(CO)$_2$—

—[NC$_6$H$_4$OC$_6$H$_4$OC$_6$H$_4$N(OC)$_2$C$_6$H$_3$COC$_6$H$_3$(CO)$_2$]-$_4$(OCH$_2$CH=CH$_2$)$_2$

Ester #3

On a Fisher-Johns melting point apparatus, the tetra-ester melts at 170°-175° C., thickens above 200° C. and crosslinks and cures at 200°-230° C. to give a plurality of repeating units of the structure:

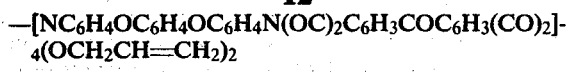

wherein Q represents the polyimide unit shown in the monomeric structure as:

(—OC)$_2$C$_6$H$_3$COC$_6$H$_3$(CO)$_2$[NC$_6$H$_4$OC$_6$H$_4$OC$_6$HN-$_4$(OC)$_2$C$_6$H$_3$COC$_6$H$_3$(CO)$_2$]$_4$.

EXAMPLE V

Preparation of Hemi-ester Acid Chloride

Part A of Example IV is repeated to obtain the hemi-ester which is isolated by evaporation of solvent from the reaction mixture and the residue is washed with ether and dried. Then to a reaction flask is added 53.5 g. of this hemi-ester, 250 ml. of dioxane, an excess (10 grams) of thionylchloride, SO$_2$Cl$_2$, and the mixture is refluxed until no more SO$_2$ or HCl is liberated. The mixture is evaporated to dryness in a rotary evaporator at 15 min. pressure to afford an almost quantitative yield (54 g.) of a product whose analysis shows 2.6% chlorine, which value is in good agreement with the calculated value for:

Ester #4

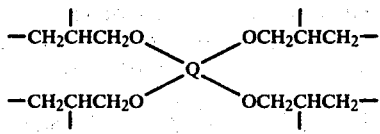

EXAMPLE VI

Conversion of the Hemi-Ester Acid Chloride (Ester #4) to Tetra-Esters

In a suitable reaction flask, 20 ml. of dioxane is added together with 5.4 g. of Ester #4, 10 gm. of anhydrous methanol (an excess) and 0.41 g. of triethylamine in 5 ml. of dioxane as a hydrohalide acceptor. The mixture is heated at reflux for 3 hours, then precipitated with water, filtered, washed with methanol and dried to yield the tetra-ester:

Ester #5

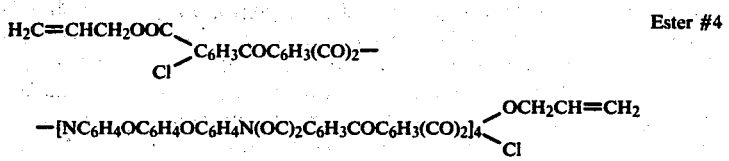

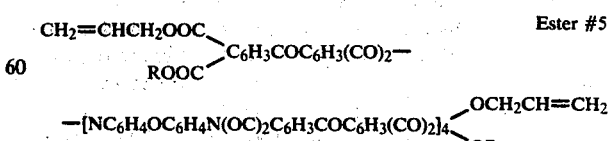

in which R is CH$_3$. When heated at 210° C. ester #5 yields crosslinked polymers of the formula shown below. Replacement of the methanol by other esterfiable ROH compounds yield the corresponding esters as shown in Table I. Isolation can also be achieved by precipitation with organic liquid in those cases where the ROH compound is not water soluble.

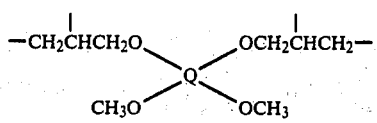

wherein Q represents the polyimide unit in the monomeric polyimide-ester having the formula:
$(-OC)_2C_6H_3COC_6H_3(CO)_2[NC_6H_4OC_6H_4-N(OC)_2C_6H_3COC_6H_3(CO)_2]_4$.

TABLE I

| Ester # | ROH Used | R in Ester |
|---|---|---|
| 6 | $C_2H_5OH$ | $C_2H_5-$ |
| 7 | $C_4H_9OH$ | $C_4H_9-$ |
| 8 | $C_{12}H_{25}OH$ | $C_{12}H_{25}-$ |
| 9 | $C_6H_5OH$ | $C_6H_5-$ |
| 10 | $CH_2=CHC_6H_4CH_2OH$ | $CH_2=CHC_6H_4CH_2-$ |
| 11 | $CH_2=C-CH_2OH$ <br>       $\|$ <br>       $Cl$ | $CH_2=CCH_2-$ <br>     $\|$ <br>     $Cl$ |
| 12 | $C_6H_{11}OH$ | $C_6H_{11}-$ |
| 13 | $C_6H_5CH=CHCH_2OH$ | $C_6H_5CH=CHCH_2-$ |
| 14 | $CH_2=CHOCH_2CH_2CH_2OH$ | $CH_2=CHOCH_2CH_2-$ |
| 15 | $CH_2=CHOC_6H_4OC_6H_4OC_6H_4OH$ | $CH_2=CHOC_6H_4O_6CH_4OC_6H_4-$ |
| 16 | $CH_2=CHOOCC_6H_4OH$ | $CH_2=CHOOCC_6H_4-$ |
| 17 | $CH_2=CHCOOCH_2CH_2OH$ | $CH_2=CHCOOCH_2CH_2-$ |
| 18 | $CH_2=CHOC_6H_4OCH_2CH_2OH$ | $CH_2=CHOC_6H_4OCH_2CH_2-$ |
| 19 | $C_6H_2Cl_3OH$ | $C_6H_2Cl_3-$ |

Esters #6 through 19 crosslink when heated in the range of 200° to 350° C.; particularly suitable for preparing more highly crosslinked polymers are esters #10, 16 and 18.

EXAMPLE VII

Preparation of Anhydride-Terminated Oligomeric Polyimide #3

Using the m-cresol-benzene azeotropic procedure, there is allowed to react BTCA (3.6251 g., 0.01125 mole) and DAPB-3,3 (2.9223 g., 0.01 mole) in 40 ml. of m-cresol and 10 ml. of benzene. There is obtained 5.6071 g. of polyimide #3 which is a light yellow powder soluble in m-cresol, DMAC, sulfolane and dioxane. On a Fisher-Johns melting point apparatus this melts at 120° C. with some evolution of gas. The TGA in air shows losses in air of 1% at 200° C.; 2% at 300° C.; 3% at 400° C.; 4% at 500° C. and 19% at 600° C. The elemental analysis shows 71.01% C, 3.22% H and 4.60% N, which values are in excellent agreement with the calculated values for the formula:
$O(OC)_2C_6H_3COC_6H_3(CO)_2[NC_6H_4OC_6H_4OC_6H_4-N(OC)_2C_6H_3COC_6H_3(CO)_2]_8O$.

EXAMPLE VIII

Preparation of Anhydride-Terminated Oligomeric Polyimide #4

Using the procedure of Example III, there is reacted BTCA (12.0827 g., 0.0375 mole) and 3,3'-sulfonyldianiline (SDA) (7.4493 g., 0.03 mole) in 80 ml. of m-cresol and 10 ml. of benzene. Polyimide #4 is obtained (16.9 g.) which is a light yellow solid, soluble in m-cresol, DMAC, SMF and sulfolane. The lowest temperature at which a sample melts completely when dropped onto a preheated block is 255° C. The TGA in air shows losses of: 2% at 200° C.; 3% at 300° C.; 4% at 400° C.; 7% at 500° C. and 26% at 600° C. The elemental analysis is: 63.9% C and 2.74% H, which values are in excellent agreement with the calculated values for the formula:
$O(OC)_2C_6H_3COC_6H_3(CO)_2[NC_6H_4-SO_2-C_6H_4-N(OC)_2C_6H_3COC_6H_3(CO)_2]_3O$.

EXAMPLE IX

Preparation of Anhydride-Terminated Polyimide #5

Using the procedure of Example III, BTCA (14.50 g., 0.045 mole) is reacted with SDA (9.9324 g., 0.04 mole) in 90 ml. of cresol and 20 ml. of benzene. Polyimide #5 is obtained (21.4 g.) which is a light yellow solid, soluble in m-cresol, DMAC, DMF and sulfolane. The lowest temperature at which a sample melts completely when dropped on a preheated block is 270° C. Its TGA in air shows losses of: 0% at 200° C.; 2% at 300° C.; 3% at 400° C.; 4% at 500° C. and 25% at 600° C. The elemental analysis shows 63.99% C, 2.73% H and 4.95% N, which values are in good agreement with the calculated values for the formula:
$O(OC)_2C_6H_3COC_6H_3(CO)_2[NC_6H_4SO_2C_6H_4-N(OC)_2C_6H_3COC_6H_3(CO)_2]_8O$.

EXAMPLE X

Preparation of Anhydride-Terminated Oligomeric Polyimide #6

Using the same azeotropic techniques as above, BTCA and 2,4-diaminotoluene (DAT) are reacted in a molar ratio of 6 to 5 to obtain polyimide #6 whose elemental analysis conforms with the formula:
$O(OC)_2C_6H_3COC_6H_3(CO)_2[NC_6H_3(CH_3)N(OC)_2C_6H_3COC_6H_3(CO)_2]_5O$.

EXAMPLE XI

Preparation of Anhydride-Terminated Oligomeric Polyimide #7

Replacement of the BTCA in Example X by an equivalent amount of pyromellitic dianhydride produces polyimide #7 which has the formula:
$O(OC)_2C_6H_2(CO)_2[NC_6H_3(CH_3)N(OC)_2C_6H_2(CO)_2]O$.

EXAMPLE XII

The anhydride-terminated polyimides #3, 4, 5, 6, and 7 are converted individually by the procedure of Examples V and VI to the corresponding di-allyl and di-vinylbenzyl terminated polyimide esters by reaction with allyl alcohol or with vinylbenzyl alcohol. When heated alone or with dicumyl peroxide, each of these yields an insoluble, infusible, cross-linked polymer.

These crosslinked polymers are represented by the following formulas:

Diallyl:

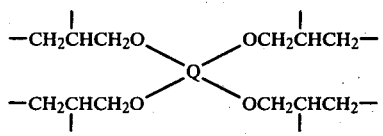

Divinylbenzyl:

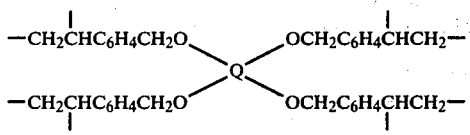

wherein Q represents the polyimide structure as present in the original monomeric polyimide-esters such as:

3:
$(OC)_2C_6H_3COC_6H_3(CO)_2[NC_6H_4OC_6H_4OC_6H_4N(OC)_2C_6H_3COC_6H_3(CO)_2]_8$

4:
$(OC)_2C_6H_3COC_6H_3(CO)_2[NC_6H_4SO_2C_6H_4N(OC)_2C_6H_3COC_6H_3(CO)_2]_3$

5:
$(OC)_2C_6H_3COC_6H_3(CO)_2[NC_6H_4SO_2C_6HN_4(OC)_2C_6H_3COC_6H_3(CO)_2]_8$

6:
$(OC)_2C_6H_3OCO_6H_3(CO)_2[NC_6H_3(CH_3)N(OC)_2C_6H_3COC_6H_3(CO)_2]_5$

7:
$(OC)_2C_6H_2(CO)_2[NC_6H_3(CH_3)N(OC)_2C_6H_2(CO)_2]$

EXAMPLE XIII

A mixture of 30 parts of polyimide ester #10, 70 parts of long fibered asbestos and 0.25 parts of cumyl peroxide is blended thoroughly and preformed into a one-inch disc which is compression molded at 1000 pounds per square inch at 265° C. for 5 minutes to yield a hard insoluble, infusible, molded product.

Similarly, a glass fiber reinforced composite is prepared by impregnating 181 E Glass Fabric with a solution of polyimide ester #10 in N-methyl pyrrolidinone to a total resin content of about 35% and the solvent removed by drying. The laminate is formed by stacking 4 sheets of impregnated glass fabric and curing at 250° C. at 200 pounds per square inch. The laminate is then post cured at 280° C. for 24 hours and shows a flexural strength value of 51,000 psi.

As an alternative representation, the polymeric compositions of this invention may be illustrated by the formula:

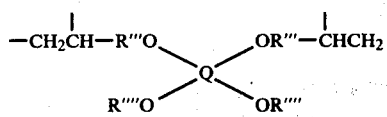

wherein Q represents the residue from an anhydride-terminated polyimide as described herein and R''' and R'''' are as defined above.

When there is a one

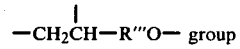

in each repeating unit, the polymer may be linear. When there are two or more such groups in a number of repeating units, the polymer is crosslinked and thereby insoluble and infusible.

Moreover, when one or both of the R'''' groups in the above formula represents a vinyl-terminated group, there may be three or four

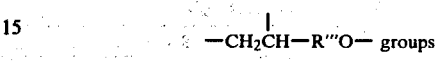

per repeating unit. However, since crosslinking and insolubility may retard and impede complete reaction of such vinyl-terminated groups before complete polymerization of such groups may be effected, it is possible and quite likely that a number of such vinyl groups are unreacted in which case the R'''' may represent unreacted vinyl-terminated groups.

While certain features of this invention have been described in detail with respect to various embodiments thereof, it will of course be apparent that other modifications can be made within the spirit and scope of this invention, and it is not intended to limit the invention to the exact details insofar as they are defined in the following claims:

The invention claimed is:

1. An addition polymerization product of the polyimide-ester of the formula:

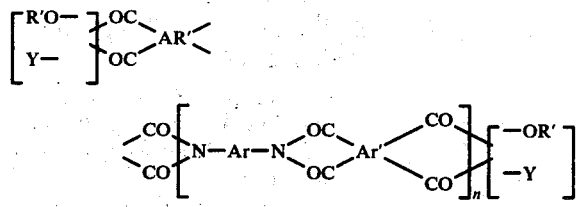

wherein:
Ar' is a tetravalent aromatic organic radical, the four carbonyl groups being attached directly to separate carbon atoms and each pair of carbonyl groups being attached to adjacent carbon atoms in the Ar' radical except that in the case of the Ar' being a naphthalene radical one or both pairs of the carbonyl groups may be attached to peri carbon atoms;
Ar is a divalent aromatic organic radical,
n is an integer of at least one;
R' is an organic moiety containing 2 to 14 carbon atoms and having a terminal $CH_2=CH-$ structure;
Y is OR or X;
R is H, R' or the residue of an alcohol other than R'OH containing one to 18 carbon atoms; and
X is a halide radical.

2. The polymerization product of claim 1 in which Y is OR.

3. The polymerization product of claim 2 in which R' is $-CH_2CH=CH_2$.

4. The polymerization product of claim 2 in which R' is $-CH_2C_6H_4CH=CH_2$.

5. The polymerization product of claim 2 in which R' is —CH$_2$C$_6$H$_4$CH$_2$CH=CH$_2$.

6. The polymerization product of claim 2 in which R is H.

7. The polymerization product of claim 3 in which R is R'.

8. The polymerization product of claim 4 in which R is R'.

9. The polymerization product of claim 5 in which R is R'.

10. The polymerization product of claim 2 in which n is at least 2.

11. The polymerization product of claim 1 in which Ar' is a radical selected from the class consisting of:

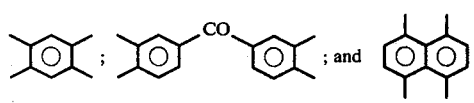

12. The polymerization product of claim 11 in which Ar' is

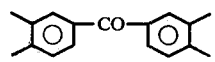

13. The polymerization product of claim 1 in which the diamine from which it is prepared is selected from the class consisting of:
1,3- and 1,4-(NH$_2$)$_2$ benzene
2,3-; 2,5-; 2,6- and 3,5-(NH$_2$)$_2$ toluene;
3,3'-; 4,4'- and 3,4'-methylene dianiline;
4,4'-; 3,3'- and 3,4'-oxydianiline;
4,4'-; 3,3'- and 3,4'-sulfonyldianiline;
1,3-; 1,4- and 1,2-bis(3-aminophenoxy)benzene; and
1,3- and 1,4-bis(4-aminophenoxy)benzene.

14. The polymerization product of claim 13 in which the diamine is a methylene dianiline.

15. The polymerization product of claim 13 in which the diamine is a sulfonyl dianiline.

16. The polymerization product of claim 13 in which the diamine is an oxydianiline.

17. The polymerization product of claim 13 in which the diamine is 2,4-toluene diamine.

18. The process of preparing the polymerization product of claim 1 which comprises heating the polyimide-ester of claim 1.

19. The process of preparing the polymerization product of claim 2 which comprises heating the polyimide ester of claim 2.

* * * * *